United States Patent
Joyce

[15] 3,670,234
[45] June 13, 1972

[54] PULSE WIDTH MODULATED VOLTAGE REGULATOR

[72] Inventor: James M. Joyce, Huntsville, Ala.
[73] Assignee: International Business Machines Corporation, Armonk, N.Y.
[22] Filed: June 30, 1970
[21] Appl. No.: 51,052

[52] U.S. Cl..............................321/18, 317/31, 317/33 VR, 321/2, 321/11, 321/14
[51] Int. Cl. ...........................................H02m 3/32
[58] Field of Search.......................321/2, 11, 14, 18, 45 R; 323/22 T; 317/31, 33 VR

[56] References Cited

UNITED STATES PATENTS 3,341,765  9/1967  Rogers, Jr. et al..........................321/2
3,559,030  1/1971  Bussard....................................321/2

Primary Examiner—J. D. Miller
Assistant Examiner—A. D. Pellinen
Attorney—Hanifin and Jancin and Thomas F. Galvin

[57] ABSTRACT

A regulated power supply of the driven power inverter type. The widths of the driver pulses are controlled by a modulation waveform which varies in accordance with variations in the regulated output from the reference potential. The driver transistors are simultaneously turned on during the dwell periods of the modulation waveform to dissipate current in the windings of the interstage transformer and switch off the power transistors. The transformer is a current transformer which includes positive feedback windings on the secondary side. The turns ratio of the positive feedback winding and the secondary current winding associated with each power transistor is set equal to the inverse current gain of the transistor to ensure a fixed gain when the transistor is in saturation. A regulated low current voltage is applied to the midpoint of the primary side of the transformer to provide low power switching of the power transistors. A transistor switch connected from the regulator output to the primary side of the transformer removes the driver pulses from the inverter in the event of a component failure.

7 Claims, 3 Drawing Figures

PATENTED JUN 13 1972 3,670,234

INVENTOR
JAMES M. JOYCE

BY Thomas F. Galvin

AGENT

3,670,234

PULSE WIDTH MODULATED VOLTAGE REGULATOR

BACKGROUND OF THE INVENTION

This invention relates to circuits which convert an unregulated D.C. power supply into a controlled output voltage which may be either D.C. or A.C. In particular this invention relates to D.C. power converters for use in environments which require highly reliable, efficient operation and lightweight components.

There is presently a great deal of interest in developing power sources which will function reliably for long periods of time in hostile environments and in areas where frequent maintenance is impossible or impractical. Applications for this type of power supply are numerous and varied — ranging from space capsules to computer systems. There are many competing power sources in these areas. Conventional batteries of numerous kinds represent the simplest and most common approach. At the most sophisticated level radioactive isotope fueled thermoelectric generators have also been developed. However, these approaches are hampered by defects which are fundamental and not amenable to easy solution. Batteries with sufficient power capability are generally unrealiable over long periods of time. Thermoelectric generators present a radioactive hazard, are inordinately expensive; and a generator large enough to supply occasional high power requirements is bulky and wasteful of precious radioactive material.

To meet the demands previously discussed, various converter and regulator circuits have been proposed to supply a reliable and efficient power output from an unregulated and inexpensive primary source. Unfortunately, previous circuits of this nature have been inefficient, too heavy or tended to subject the primary source or the output load to destructive overloading.

It has been recognized in recent years that D.C. inverter type power supplies offer a reasonable solution to voltage regulation problems.

The most promising inverter has comprised basically a high frequency oscillator which produces pulses to operate a pair of driver transistors in push-pull fashion. The driver transistors are coupled via an interstage transformer to a power inverter-amplifier stage, typically including a pair of power transistors which are cyclically switched on and off by the drivers. The power transistors modulate the unregulated D.C. supply to provide a regulated A.C. output which may be converted to D.C. by an ordinary filter arrangement.

In more sophisticated versions of this type of circuit, commonly termed pulse modulated regulators, the width or the amplitude of the oscillator pulses is varied according to variations in the unregulated supply or in the regulated output. For example, in one successful circuit the amplitude of the oscillator is varied as a function of the amplitude of the unregulated D.C. power source without the use of feedback. In another well-known modulated regulator, the regulated output is compared differentially with a stable reference voltage. The difference voltage is fed to a variable oscillator which causes a variation in the input pulse width to compensate for a variation in input potential.

Unfortunately, present day pulse modulated regulators suffer from defects which preclude them from offering the desired qualities of high efficiency, compactness and reliable operation. The existing design of the interstage transformer is a particularly thorny problem. It tends to be bulky, distorts the square wave signal supplied to the power transistors, dissipates maximum power during the dwell time of the modulation signal and offers no protection against crossover current in the power transistors which arises due to the transistor storage time. In addition, existing PWM regulators offer little protection against component failures which cause serious overloads in the output.

SUMMARY

Accordingly, it is a principal object of this invention to improve the efficiency of a regulator circuit which operates at high frequencies and to provide a regulator which uses lightweight components.

It is another object to protect the output load of a regulator against destructive output voltages.

In accordance with one feature of this invention, these and other objects are accomplished by providing circuit means for producing a modulation waveform having a duty cycle, termed an active period, which varies in accordance with variations in the regulated output voltage. The modulation waveform gates a control section which, among other functions, holds both driver transistors in the conductive state during the dwell period of the modulation waveform. This causes a short across the primary side of an interstage current mode transformer, switching the power amplifier stage off completely and allows energy stored in the primary side of the interstage transformer to be dissipated. The standard push-pull operation in the prior art, on the other hand, causes the stored energy to be discharged into the secondary side of the interstage transformer during the dwell time of a modulation waveform. This energy distorts the waveform and partially turns on the power amplifier stage, resulting in inefficient operation. Another advantage of the present inventive feature is a decrease in power transistor storage time. Any energy stored in the base of the conducting power transistor is discharged by the shorted primary winding during the dwell period of the modulation waveform. The reduction in storage time also reduces a problem inherent in prior art regulators-cross-over distortion in the power transistors. In standard regulators, when the off-transistor is driven on, the storage time of the off-going transistor results in both collectors conducting simultaneously. This crossover distortion, which is reduced by the present inventive feature, causes current surge spiking which reduces efficiency and transistor reliability.

ANother feature of this invention is the provision of a lightweight transformer which couples the driver and amplifier stages. A regulated low current voltage source is connected to the midpoint of the primary winding to provide positive switching of the power amplifier transistors from a low power source thereby allowing the transformer to be operated in the current mode. The secondary side of the transformer comprises secondary windings connected to the bases of the power transistors, and positive feedback windings connected in series with the collectors of the power transistors. The turns ratio of the positive feedback and secondary winding connected to each power transistor is established to be equal to the inverse current gain of the transistor, providing a fixed current gain from the transistors when they are saturated.

A third feature of this invention is a transistor switch circuit connected between the regulated output and the primary side of the transformer to provide a low impedance path from the driver stage to ground in the event of an unacceptable increase in output voltage. This path removes the driver signals from the power amplifier stage until the output voltage is reduced.

Figure 1:
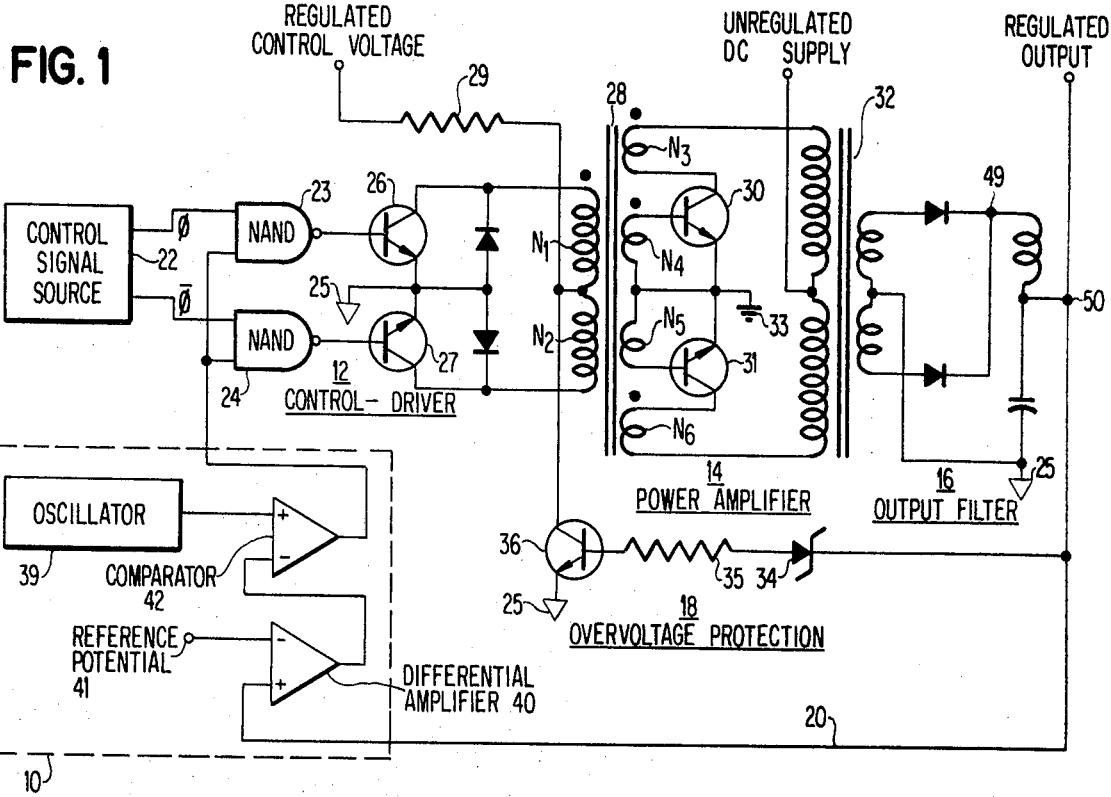
FIG. 1 is a circuit representation of a preferred embodiment of the invention.

The regulated power supply of FIG. 1 includes circuit means 10 for providing a modulation pulse which varies in direction depending on the magnitude of a voltage fluctuation in the regulated output 50, a control-driver stage 12, interstage transformer 28, a power amplifier stage 14, output transformer 32, an output filter stage 16 and an overvoltage protection circuit 18 connected between the regulated output and the primary side of transformer 28.

The control section of control-driver stage 12 includes, in the specific circuit of FIG. 1, a control signal source 22 having two outputs connected to a pair of NAND gates 23 and 24. The control section provides a means for switching driver transistors 26 and 27 off and on in response to modulation pulses from comparator 42 of modulation circuit means 10. Control signal source 22 provides output pulses alternately on output signal lines $\phi$ and $\bar{\phi}$ which are 180° out of phase with each other. The $\bar{\phi}$ output line from source 22 is connected to one input of NAND gate 23. The 0 output line is connected to one input of NAND gate 24. NAND gates 23 and 24 are connected to the base terminals of driver transistors 26 and 27, respectively. The emitters of transistors 26 and 27 are connected in common to the signal ground. The collector of transistors 26 and 27 are connected, respectively, to the primary windings $N_1$ and $N_2$ of transformer 28.

Interstage transformer 28 couples the driver stage to the power amplifier stage 14, turning power transistors 30 and 31 alternately off and on, providing an AC output at the transformer 32. Transformer 28 is a current transformer containing low power control windings $N_1$ and $N_2$ on the primary side and feedback current windings, $N_3$ and $N_6$, and secondary current windings, $N_4$ and $N_5$, on the secondary side. The feedback current windings are wound to aid the current flow in the secondary windings to provide positive feedback as indicated by the dots placed at the terminals of the windings. A regulated control voltage is applied through resistor 29 to the midpoint of the primary side of transformer 28. The values of the control voltage and resistor 29 are selected to provide low current to the transformer 28, causing it to operate in the current mode.

Feedback windings $N_3$ and $N_6$ of transformer 28 are connected at the collectors of the power inverter transistors 30 and 31, respectively. The emitters of transistors 30 and 31, and the midpoint of the secondary side of transformer 28 are connected to the prime power ground 33. Obviously, terminals 25 and 33 may be connected to the same ground supply. However, in this type of circuit it is advantageous to provide a separate ground for the power transistors. As will be explained in more detail in a succeeding section, the turns ratio of windings $N_3$ and $N_4$ and windings $N_5$ and $N_6$ are selected to ensure that the current gains of power transistors 30 and 31 remain fixed when in saturation.

Power transistors 30 and 31 are connected to the primary side of transformer 32 via windings $N_3$ and $N_6$, respectively. The unregulated D.C. supply is connected to the midpoint of the primary of transformer 32. This voltage source may have a substantial variation at a relatively low frequency. This variation is virtually eliminated by means of the present regulator circuit. The secondary of the transformer 32 is connected to an output filter circuit 16. The structure and operation of this filter circuit are quire well-known in the art, and will not be described further. It is apparent that other configurations for filter 16 are possible.

Overvoltage protection circuit 18 is provided between the regulated output and the midpoint of the primary side of transformer 28. In FIG. 1, this circuit comprises a series connection of zener diode 34, resistor 35, and transistor 36. The zener diode is preferably designed to have a zener voltage somewhat greater than the desired regulated output voltage. In this configuration transistor 36 has a high output impedance with respect to the control-driver stage and is essentially nonconducting when the regulated output voltage is below the zener voltage.

The modulation circuit means 10 provides modulation pulses to switch the driver transistors. The active region of the pulses varies in accordance with variations in the regulated output voltage about the reference potential. During the dwell period, both driver transistors are held in their conductive state. Modulation circuit means 10 is connected between the regulated output line 20 and second input connections of NAND gates 23 and 24, and in the preferred embodiment comprises differential amplifier 40, comparator 42, reference potential 41 and oscillator 39. The positive, i.e., non-inverting input of amplifier 40 is connected to the regulated output; the negative input connection to amplifier 40 is reference potential 41. The output of amplifier 40 is connected to the negative input of comparator 42. The output of comparator 42 is connected in parallel to the input lines of NAND circuits 23 and 24. Oscillator 39 provides a well defined triangular waveform at a fixed frequency and amplitude. In the preferred embodiment, the waveform varies peak-to-peak from −1 to +1 volts at a frequency of 50 KHz.

Figure 2:
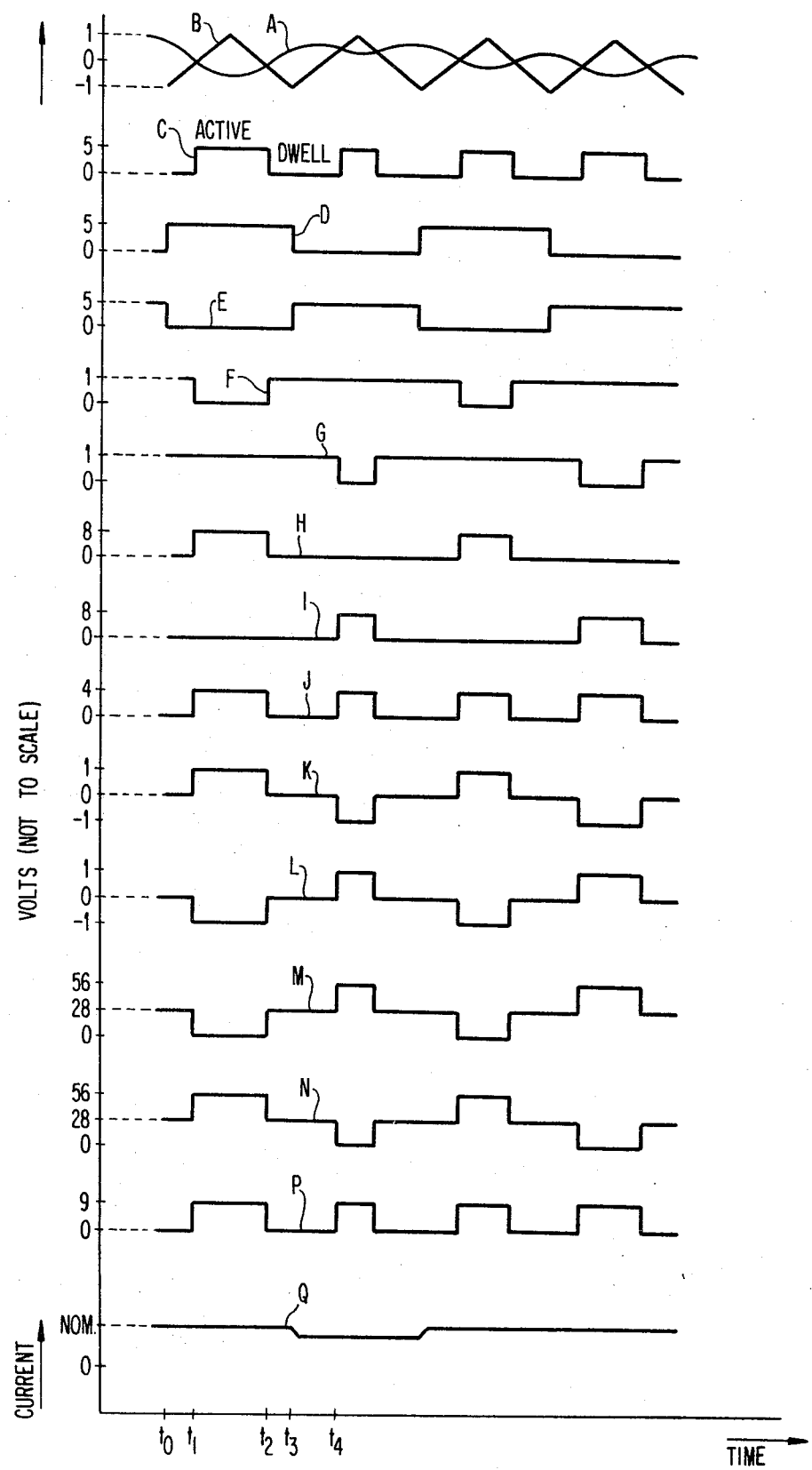
FIG. 2 is a graphical representation of idealized waveforms illustrating the normal operation of the circuit of FIG. 1.

The operation of the regulator of this invention will be better understood by referring to FIG. 2 in conjunction with FIG. 1. It is convenient to begin at the regulated output 50 where a D.C. voltage appears which may vary from the desired reference potential 41. In this illustration the reference potential is selected to be 5 volts D.C. and the desired regulated output is 5 volts D.C. at 10 Amp.

The regulated output voltage is fed back via output error line 20 to the positive input of differential amplifier 40 of modulation circuit means 10. Any difference between the reference potential 41 and the output voltage is detected by amplifier 40. The error signal is then fed to the negative input side of comparator 42. The 50 KHz triangle waveform of oscillator 39 is connected to the positive input side of comparator 42. FIG. 2A and 2B depict, respectively, the waveforms of the amplified error signal and the triangle waveform. For ease of understanding, the waveforms are illustrated as being superimposed. At time $t_0$, the triangle waveform starts to rise. The rising triangle waveform intersects the error signal at time $t_1$; the falling waveform intersects the error signal at time $t_2$. The width of the triangle waveform is $t_3-t_0$ seconds which is 20 microseconds in this embodiment.

The output of comparator 42 is a square pulse, FIG. 2C, the duration of which is a function of the relative amplitudes of the triangle waveform and the error signal. The modulation waveform is active, at an up-level of 5 volts, when the triangle waveform has a higher amplitude than the error signal, and in the dwell period of 0 volts when the error signal is greater than the triangle waveform. The amplitude of the modulation waveform is, of course, independent of the other waveforms. In FIG. 2C, the duration of the first active period of the modulation waveform is $t_2 - t_1$ seconds.

In the ideal situation, the signal from the regulated output would be at the reference potential, 5 volts. The output from differential amplifier 40 would then be 0 volts. The detected error signal, FIG. 2A, would then be substantially horizontal at the 0-volt level. The active period of the modulation waveform (FIG. 2C) from comparator 42 would then be 10 microseconds, which is the pulse width of the 0-volt (half-amplitude) level of the triangle waveform (FIG. 2B). If the regulated output voltage varies below the reference potential, the modulation waveform active period increases, yielding a 5-volt pulse greater than 10 microseconds wide. Conversely, a regulated output voltage above 5 volts causes the active period to be less than 10 microseconds.

The modulation waveform from comparator 42 is fed to second inputs of NAND gates 23 and 24. Control signals $\phi$ and $\bar{\phi}$ are fed to the first inputs of the NAND circuits from control signal source 22. The idealized waveforms of control signals $\phi$ and $\bar{\phi}$ are depicted in FIG. 2D and 2E, respectively. The turn-off and turn-off times are synchronized with the turn-on and turn-off times of the triangle waveform at times $t_0$ and $t_3$ for the first control signal so that one or the other control signal is in phase with the triangle waveform. This also ensures that the control signals are synchronized with the modulation waveform and that the maximum possible width of the latter equals the width of the control signal. The output of one or the other NAND gate is a negative pulse when its associated control signal is positive and the modulation waveform is active (+5 volts). The pulse has a duration equal to the duration of the active period of the modulation waveform. During the dwell period of the modulation waveform both NAND gates will be positive (off) simultaneously as may be seen from FIGS. 2F and 2G. When one of the NAND gates is on, its associated driver transistor is off and its collector output is positive as depicted in FIG. 2H for transistor 26 and in FIG. 2I for transistor 27. FIG. 2J shows the pulse pattern at the center tap of the primary side of transformer 28. The pattern is essentially a superposition of FIGS. 2H and 2I but with the amplitude maximum being 4 volts, one-half the amplitude of the outputs of the driver transistors. When both NAND gates are off, both driver transistors are conducting and their collectors are at 0 volts. This shorts any current in the windings $N_1$ and $N_2$ to signal ground 25.

In summary to this point, the operation of modulation circuit means 10 has been shown to provide a means for supplying pulses to the control section, which vary in width according to variations in the regulated output voltage and which have a substantially constant amplitude. The control signal source 22 and NAND gates 23 and 24 illustrate a means for switching driver transistors 26 and 27 off alternately and cyclically during alternate active periods of the modulation waveform and for holding both transistors on during the dwell periods of the modulation waveform. The significance of this latter property will be explained in more detail below.

To analyze the operation of interstage transformer 28, assume that the modulation waveform is in an active period and that the 0 signal from control source 22 is positive. The output from NAND gate 23 is then negative and the output from NAND gate 24 is positive. Hence, driver transistor 26 is off and driver transistor 27 is on. The collector of transistor 27 is at 0 volts. Control current from the regulated control voltage passes through resistor 29 and winding $N_2$ to signal ground. In the preferred embodiment, the regulated control voltage is +12 volts and resistor 29 is 1 kilohm, ensuring a low current, low power coupling of the modulation signal from signal ground to power ground. The control current generates a positive voltage through secondary winding $N_4$ (FIG. 2K) at the base of power transistor 30 and turns it on. The collector of transistor 30 goes to 0 volts. The 28 volt unregulated D.C. supply conducts through the positive feedback winding $N_3$ through transistor 30. This causes the base current of transistor 30 to be regenerated until the transistor is saturated. Because the turns ratio of windings $N_3/N_4$ is set at: $N_3/N_4 = I_b/I_c$, the inverse current gain of transistor 30 remains fixed in the saturated mode. This operation has the important advantage of providing a fixed current gain from power transistor 30 and also provides base current drive from the more efficient unregulated D.C. voltage source.

Similarly, the turns ratio: $N_6/N_5$ is set equal to $I_b/I_c$ of transistor 31; and the operation previously described for power transistor 30 will be substantially the same for transistor 31 when driver transistor 26 is on and transistor 27 is off as may be seen in FIG. 2L. The turns ratios, $N_3/N_4$ and $N_6/N_5$ are approximate because they must be adjusted slightly for the small amount of base current supplied from windings $N_1$ and $N_2$ which is limited by resistor 29.

When the modulation waveform is in its dwell period, FIG. 2C, it can be seen from FIGS. 2H and 2I that both driver transistors 26 and 27 are turned on. For example, the first dwell period of the modulation waveform in FIG. 2C occurs between times $t_2$ and $t_4$. It may also be seen from FIG. 2H that driver transistor 26 switches on at time $t_2$ and that driver transistor 27 is already on at $t_2$ and until the next active period of the modulation waveform at time $t_4$. With both driver transistors on, the windings $N_1$ and $N_2$ act as a low impedance 'sink' for the magnetically coupled current in windings $N_3$ or $N_4$, depending on which power transistor is turning off. The transistor base storage time is also reduced by this means. A marked increase in over-all efficiency results.

The output at the collectors of power transistors 30 and 31 is depicted in FIGS. 2M and 2N, respectively. The output pulses have a 28-volt reference level, the value of the unregulated D.C. potential, and have pulse widths equal to the corresponding active regions of the modulation waveforms. FIG. 2P illustrates the output across the secondary of transformer 32 at terminal 49. This portion of the circuit is standard in the art and its operation will be well understood. The up level of the output is 9 volts, determined by the turns ratio of the primary and secondary windings of the output transformer. In the present preferred embodiment the turns ratio of the secondary and primary windings of transformer 32 is 0.45.

FIG. 2Q illustrates the current drawn by the output load. If the current output decreases, the regulated output tends to increase and the error waveform in FIG. 2A rises above the 0 level. The modulation waveform, FIG. 2C, then decreases in width and the output voltage is reduced accordingly.

OVERVOLTAGE PROTECTION CIRCUIT

Figure 3:
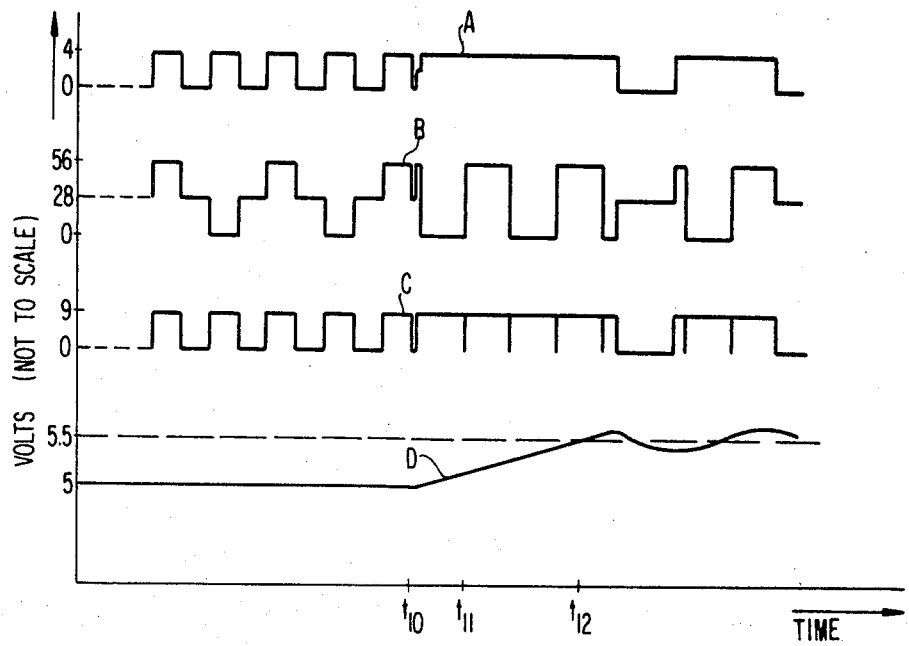
FIG. 3 is a graphical representation of idealized waveforms illustrating the operation of the overvoltage protection circuit of FIG. 1.

In the event of a failure in one of the operating components this circuit protects the output load circuit by regulating the voltage at 10 percent higher than nominal. This is, of course, an arbitrary figure. Under normal operating conditions, transistor 36 is always off, providing a high impedance between ground 25 and its collector. During normal operation, the regulated output voltage will remain at a set level below the zener voltage of diode 34, preventing transistor 36 from turning on. In this embodiment, the zener voltage is selected to be 500 mv or 10 percent above the nominal output voltage of 5 volts. Failure modes common to this type of regulator may cause the power amplifier stage to generate a full square wave as depicted in FIG. 3A. Among the component failures which may cause this operation are: defective control or driver transistors, up-level failures in the amplifiers of the modulation waveform circuit means, or a loss of any of the control voltages. In the environments for which this regulator is designed, such failures might well be catastrophic. At best, a component failure is inconvenient because of the great difficulty of repair. The overvoltage protection circuit obviates this problem by ensuring that the output voltage will never exceed 6 volts. If the regulated output voltage at terminal 50 exceeds the zener voltage of diode 34, transistor 36 will turn on. This provides a low impedance path across the primary windings $N_1$ and $N_2$ of transformer 28. Current is thus shunted through windings $N_1$ and $N_2$ to signal ground. This causes power transistors 30 and 31 to turn off, returning the output voltage to a level from 1 volt to 500 mv higher than the normal output level. One example of a component failure which results in this operation is illustrated in FIG. 3.

In FIG. 3A, the first five pulses of the train appearing at the center tap of the primary winding of transformer 28 are depicted as in normal operation. The sixth pulse, at time $t_{10}$, indicates a defect, e.g., comparator 42 fails in the positive state. The half wave pulses have converted to a full wave pattern. This affects the operation of power transistor 30 by changing its output from pulses which vary from 28 to 56 volts to pulses which vary from 0 to 56 volts as shown in FIG. 3B starting at time $t_{11}$. The amplified power signal appearing at terminal 49, is depicted in FIG. 3C. It has become full wave rather than half wave, with the result that the regulated output voltage, depicted in FIG. 3D, starts to rise above the nominal 5-volt potential. As the 5.5 volt zener potential of diode 34 is exceeded at time $t_{12}$, transistor 36 begins to conduct, providing a low impedance path through windings $N_1$ and $N_2$ from the regulated control voltage to ground. This turns the power transistor 30 off a short time later for a period until the regulated output goes below the zener voltage of 5.5 volts. The voltage regulator will continue to regulate the output voltage from 500 mv to 1 volt higher than the reference potential with a duty cycle determined by the output load and the response time of filter 16.

While the invention has been particularly shown and described with reference to a preferred embodiment thereof, it will be understood by those skilled in the art that various changes in form and detail may be made therein without departing from the spirit and scope of the invention.

What is claimed is:

1. In a voltage regulator operating from an unregulated D.C. supply voltage to provide a regulated output, and including a driver stage coupled to a power amplifier stage by an interstage transformer, with the power amplifier stage connected to the unregulated supply voltage and the output load to intermittently apply the supply voltage to the load, and with the driver and power amplifier stages each having first and second transistors, the improvement comprising:

modulation circuit means, having an input connected to the regulated output and having an output, for producing a modulation waveform having active and dwell periods which vary in width in accordance with variations in the regulated output voltage and which have a substantially constant amplitude; and control means connected between the output of the modulation circuit means and the driver stage for alternately switching the driver transistors to their non-conductive state out of phase with each other when the modulation waveform is in an active period and for switching both transistors to their conductive states when the modulation waveform is in a dwell period.

2. A regulator as defined in claim 1 wherein the modulation circuit means includes:

a source of a reference potential;

oscillator means for generating a triangle waveform;

differential amplifier means, having first and second inputs connected to the regulated output voltage and the source of the reference potential, respectively, and having an output, for generating a signal representing the difference between the reference potential and the output voltage;

comparator means, having first and second inputs connected to the oscillator means and the output of the amplifier means, respectively, for producing the modulation waveform.

3. A regulator as defined in claim 1 wherein the control means includes:

a source of output signals at first and second output terminals, the signals being alternately and cyclically out of phase with each other, having a duration which is equal to the maximum duration of the active period of the modulation waveform and in synchronism therewith; and first and second gating means, having first inputs connected to the first and second outputs, respectively, of the source of output signals, having second inputs connected to the output of the modulation circuit means, and each having an output connected to the first and second driver transistors, respectively, for switching the transistors in accordance with signals received from the source of output signals and the modulation circuit means.

4. A regulator as defined in claim 1 wherein the interstage transformer includes:

first and second feedback current windings on the secondary side connected in series with the collectors of the first and second power transistors, respectively, the turns ratio of the feedback current winding and the secondary winding being equal to the inverse current ratio of their associated power transistor whereby the current gain of the transistors remains fixed in saturation.

5. A regulator as defined in claim 1 further comprising:

a source of a regulated low current voltage connected to the midpoint of the primary side of the interstage transformer for providing low power switching of the power transistors.

6. A regulator as defined in claim 1 further comprising:

overvoltage protection means connected between the regulated output and the primary side of the interstage transformer for detecting variations in the output voltage and to adjust the operating level of the interstage transformer when the output voltage exceeds a predetermined level.

7. A regulator as defined in claim 6 wherein the overvoltage protection means includes:

a zener device having a zener voltage at the predetermined output voltage level and having an input connected to the regulated output voltage output and having an output; and transistor switching means, having an input connected to the zener device output and having a first output connected to the primary side of the interstage transformer and having a second output connected to ground, said transistor switching means having a high impedance between its first and second outputs when the regulated output is below the zener voltage of the zener device and having a low impedance when the zener voltage is exceeded, for providing a low impedance path from the primary side of the interstage transformer to ground.

* * * * *